United States Patent
Arakawa et al.

(10) Patent No.: US 7,403,124 B2
(45) Date of Patent: Jul. 22, 2008

(54) DRIVING SUPPORT EQUIPMENT FOR VEHICLES

(75) Inventors: Toshiya Arakawa, Tokyo (JP);
Noriyoshi Matsuo, Tokyo (JP);
Masahiro Kinoshita, Tokyo (JP);
Shinichi Satomi, Tokyo (JP); Takashi Kondo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 117 days.

(21) Appl. No.: 11/415,515

(22) Filed: May 2, 2006

(65) Prior Publication Data

US 2006/0255956 A1    Nov. 16, 2006

(30) Foreign Application Priority Data

May 10, 2005  (JP)  ............................. 2005-137719
Sep. 9, 2005   (JP)  ............................. 2005-262561

(51) Int. Cl.
G08B 23/00   (2006.01)
(52) U.S. Cl. ........................ 340/576; 340/933
(58) Field of Classification Search ................ 340/575, 340/576, 573.1, 435, 436, 438, 901, 903, 340/933, 37
See application file for complete search history.

(56) References Cited

U.S. PATENT DOCUMENTS

| 5,786,765 | A  | * | 7/1998  | Kumakura et al. | 340/576 |
| 6,974,414 | B2 | * | 12/2005 | Victor          | 600/300 |
| 2002/0116156 | A1 | * | 8/2002 | Remboski et al. | 702/188 |
| 2005/0030184 | A1 | * | 2/2005 | Victor          | 340/576 |

FOREIGN PATENT DOCUMENTS

JP    11/276461    10/1999

* cited by examiner

*Primary Examiner*—Van T. Trieu
(74) *Attorney, Agent, or Firm*—Haynes and Boone, LLP

(57) ABSTRACT

A driving support equipment for a vehicle is provided, the equipment comprising a frontward information recognition unit for recognizing environs information at the front of the vehicle; a preceding vehicle information detection unit for detecting preceding vehicle information from the environs information at the front of the vehicle; an eye motion detection unit for detecting an eye motion of a driver who drives the vehicle; a dispersion value processing unit for processing a value showing a dispersion of the eye motions regarding the preceding vehicle, detected by the eye motion detection unit; an attention state estimation unit for estimating an attention state of the driver regarding the preceding vehicle, using the value showing the eye motion dispersion; and an alarm control unit for varying a vehicle alarm according to the estimated attention state of the driver.

16 Claims, 13 Drawing Sheets

Awake condition

Less awake condition

DRIVING SUPPORT EQUIPMENT FOR VEHICLES

CROSS-REFERENCE TO RELATED APPLICATIONS

This application claims the priority benefits of Japanese Patent Application No. 2005-137719 entitled "Driving Support Equipment For Vehicles", filed on May 10, 2005, and of Japanese Patent Application No. 2005-262561 entitled "Driving State Estimation Equipment", filed on Sep. 9, 2005.

FIELD OF THE INVENTION

The present invention relates to driving support equipment for vehicles, for when solid objects exist at the front of the vehicle, the driving state of the driver is accurately estimated, and appropriate alarms are accomplished depending on the forward attention state and the awake state of the driver.

BACKGROUND OF THE INVENTION

In recent years, as driving support equipment for vehicles, various technologies have been developed and put to practical use. They include placing cameras, etc. in vehicles, for detecting the forward travel environments, and controlling alarms regarding frontward obstacles. They also include technologies for detecting preceding vehicles in the travel environment and controlling the following or alarms regarding such preceding vehicles.

Additionally, technologies have recently been developed for estimating the driver's attention, and varying alarms based on such attention.

For example, Japanese Patent Publication No. Hei 11-276461A1 discloses a technology wherein the driver's eyeball transfer movements are detected, the driver's attention level is estimated from such eyeball transfer movements, and then information is presented earlier when such attention levels are lower.

When a preceding vehicle exists at the front, a necessity arises for the driver to provide enough attention within his forward sight to this preceding vehicle.

However, according to the driver's condition, such attention may be aimless. In the reverse, there may be cases where he invests too much in the attention on the preceding vehicle and be negligent regarding other surrounding information.

The above-mentioned prior art has difficulty distinguishing such changes in the attention relating to preceding vehicles. Technologies for adequately providing alarms to the driver when such preceding vehicles exist, are highly desired.

SUMMARY OF THE INVENTION

Therefore, the objective of the present invention is to provide a driver support equipment for vehicles which, when taking in consideration the above-stated circumstances, accurately determines the changes in the driver's attention when preceding vehicles or other obstructing objects exist, and performs appropriate alarms to the driver, according to such varying attention states.

According to the first aspect of the invention, there is provided a driving support equipment for a vehicle, comprising a frontward information recognition unit for recognizing environs information at the front of said vehicle; a preceding vehicle information detection unit for detecting preceding vehicle information from the environs information at the front of said vehicle; an eye motion detection unit for detecting an eye motion of a driver who drives the vehicle; a dispersion value processing unit for processing a value showing a dispersion of said eye motion regarding said preceding vehicle, detected by the eye motion detection unit; an attention state estimation unit for estimating an attention state of the driver regarding said preceding vehicle, using said value showing the eye motion dispersion; and an alarm control unit for varying a vehicle alarm according to said estimated attention state of the driver.

According to the second aspect of the invention, a driving support equipment for a vehicle is provided, having an environs information detection unit for recognizing a solid object in an environs of the vehicle; an eye motion detection unit for detecting an eye motion of a driver of the vehicle; a dispersion value processing unit for processing a value showing a dispersion of the eye motions regarding said solid object; and an attention state estimation unit for estimating an attention state of the driver regarding said solid object, using said value showing the dispersion of eye motions of the driver.

According to the third aspect of the invention, a driving state estimation equipment for a vehicle is provided, having a solid object information detection unit for recognizing a solid object in an environs of the vehicle and detecting information regarding said solid object; an eye motion detection unit for detecting an eye motion of a driver of the vehicle; a determination area setting unit for setting a determination area based on the solid object information detected by said solid object information detection unit; and a driving state determination unit for determining a driving state of the driver, based on a ratio of a stoppage period of a line of sight of the driver within said determination area, as detected by the eye motion detection unit, with a standard stoppage period, which is a stoppage period of the line of sight within said determination area under circumstances set beforehand.

According to the fourth aspect of the invention, a driving state estimation equipment for a vehicle is provided, having a solid object information detection unit for recognizing a solid object in an environs of the vehicle and detecting information regarding said solid object; an eye motion detection unit for detecting an eye motion of a driver of the vehicle; a determination area setting unit for setting a determination area based on the solid object information detected by said solid object information detection unit; and a driving state determination unit for determining a driving state of the driver, based on said driver's eye angle as detected by the eye motion detection unit and on a ratio of a stoppage period of a line of sight of within said determination area, as detected by the eye motion detection unit, with a standard stoppage period, which is a stoppage period of the line of sight within said determination area under circumstances set beforehand.

According to the fifth aspect of the invention, a driving state estimation equipment for a vehicle is provided, having a solid object information detection unit for recognizing a solid object in an environs of the vehicle and detecting information regarding said solid object; an eye motion detection unit for detecting an eye motion of a driver of the vehicle; a determination area setting unit for setting a determination area based on the solid object information detected by said solid object information detection unit; and a driving state determination unit for determining a driving state of the driver, based on said driver's eye angle and on a degree of concentration of a line of sight of the driver existing within said determination area, as detected by the eye motion detection unit.

According to the sixth aspect of the invention, a driving state estimation equipment for a vehicle is provided, having a solid object information detection unit for recognizing a solid object in an environs of the vehicle and detecting information regarding said solid object; an eye motion detection unit for detecting an eye motion of a driver of the vehicle; a determination area setting unit for setting a determination area based on information on a plurality of solid objects detected by said solid object information detection unit which does not include information on a preceding vehicle; and a driving state determination unit for determining a driving state of the driver, based on a degree of concentration of a line of sight existing within said determination area, as detected by the eye motion detection unit.

According to the seventh aspect of the invention, a driving support equipment for a vehicle is provided, having a solid object detection unit for detecting a solid object existing in the environs of the vehicle; an eye motion detection unit for detecting an eye motion of a driver who drives the vehicle; a driving state estimation unit for estimating, using said eye motion detected by the eye motion detection unit, a driving state of the driver regarding said solid object; and an alarm control unit for controlling a vehicle alarm according to said driving state of the driver estimated by the driving state estimation unit so as to cause a warning to the driver regarding an obstructive object in the environs.

Having described the invention, the following examples are given to illustrate specific applications of the invention including the best mode now known to perform the invention. These specific examples are not intended to limit the scope of the invention described in this application.

DETAILED DESCRIPTION OF THE PREFERED EMBODIMENT

In the below detailed description, preferred embodiments of the present invention are explained, based on the accompanying drawings.

Figure 1:
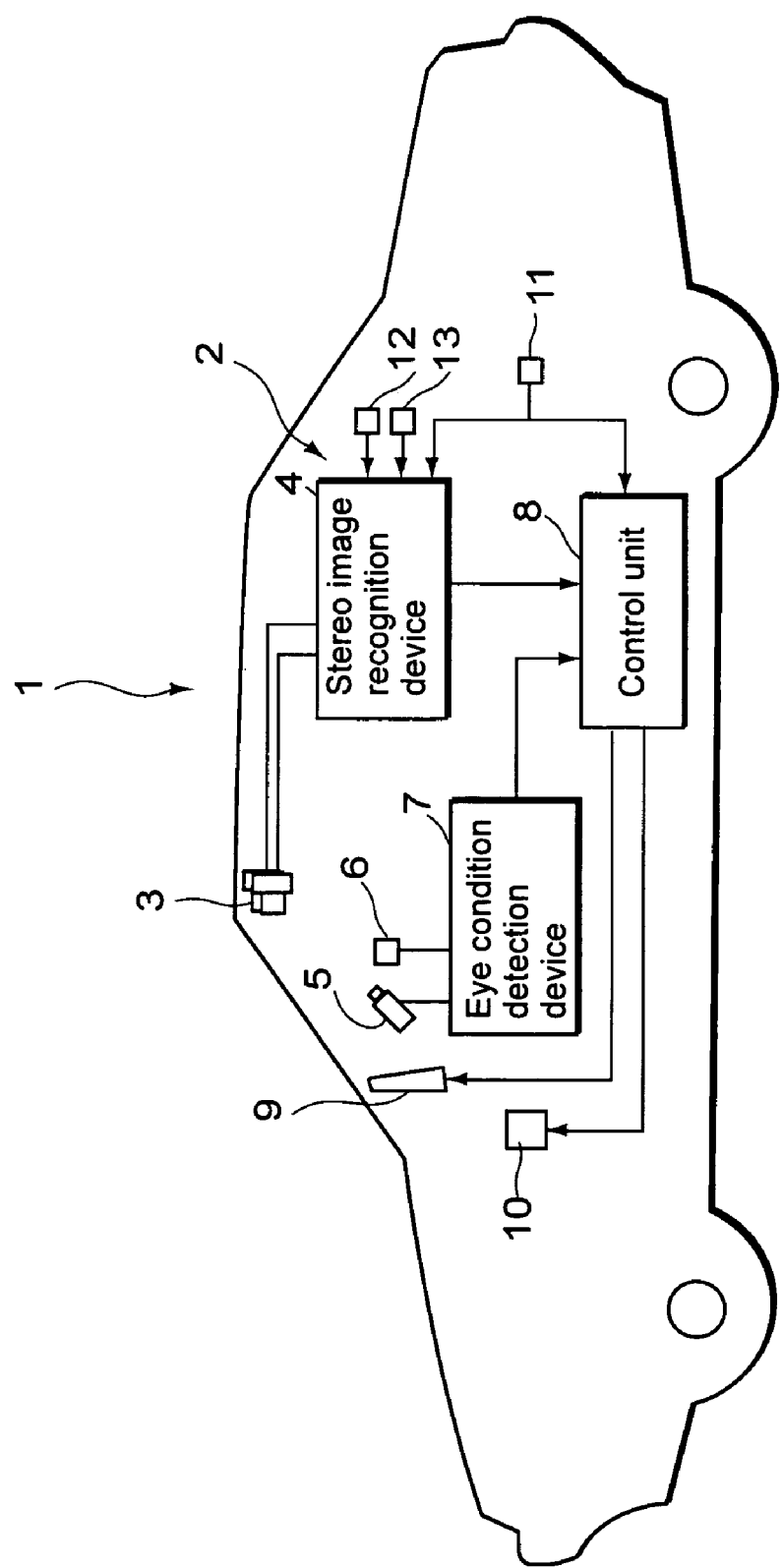
FIG. 1 is an outline construction view of a driving support equipment loaded on a vehicle.

In FIG. 1, reference numeral 1 indicates a vehicle such as a car, etc. (automotive vehicles). Loaded on the automotive vehicle 1 is driving support equipment 2, possessing functions for performing contact alarms regarding preceding vehicles or contact alarms regarding frontward obstacle objects other than preceding vehicles.

This driving support equipment 2 is prepared with and mainly constructed with a stereo camera 3 for perceiving the vehicle's front exterior, a stereo image recognition device 4 for handling signals from the stereo camera 3, a view camera 5 for perceiving the driver's eyeball movements, an eye condition detection device 7 which uses an infrared lamp 6 to detect the driver's eye condition, a control unit 8, a monitor 9 for indicating alarms, and a sound generation device 10 for giving out alarms.

Additionally, automotive vehicle 1 is provided with a vehicle speed sensor 11 for detecting vehicle speed, a handle angle sensor 12 for detecting handle angles, and a yaw rate sensor 13 for detecting yaw rates.

The vehicle speed from the vehicle speed sensor 11 is inputted into the stereo image recognition device 4 and the control unit 8, and the handle angle from the handle angle sensor 12 and the yaw rate from the yaw rate sensor 13 are inputted into the stereo image recognition device 4.

The stereo camera 3 is constructed with a set of (left right) charge coupled device (CCD) cameras, which use as a stereo optical system, for example, solid-state image sensing devices such as a CCD, etc. These left-right CCD cameras are respectively installed at a fixed interval on the front ceiling of the vehicle interior. They perform stereo image acquisitions of the vehicle exterior (solid objects) from different viewpoints and output image data to the stereo image recognition device 4.

The stereo image recognition device 4 has inputted into it the respective signals of the image data from the stereo camera 3, vehicle speed, handle angle, and yaw rate. Based on the image data, it detects the frontward condition for solid objects data, side wall data, and white line data at the automotive vehicle's 1 front. With such frontward information and the driving condition of the automotive vehicle 1, it estimates the advancing path (automobile advancing path) of the automotive vehicle 1.

Then, it establishes a traveling sphere based on this automobile advancing path, and according to the existence states of solid objects related to this traveling area, it discerns and extracts preceding vehicles at the automotive vehicle's 1 front. This result is outputted to the control unit 8.

The above-mentioned automobile advancing path is, for example, estimated as follows. At this point, the 3-dimensional coordinate system in real space is made to be fixed coordinate system of the automotive vehicle 1. The automotive vehicle's 1 left-right (width) directions are shown as the X coordinate, the automotive vehicle's 1 up-down directions are shown as the Y coordinate, and the automotive vehicle's front-rear directions are shown as the Z coordinate.

Then, the road surface right beneath the middle of the two CCD cameras, which make up the stereo camera 4, is made as the origin point. The automotive vehicle's 1 right side is the + side of the X axis, the automotive vehicle's 1 upper direction is the + side of the Y axis, and the automotive vehicle's 1 front direction is the + side of the Z axis.

The automobile advancing path estimation based on the white line—white line data of one side of either the left or right is gotten. If the shape of the traffic lane in which the automotive vehicle 1 is traveling can be estimated, the automobile advancing path is formed to go parallel with the white line, taking into consideration the automotive vehicle's 1 width, the present position of the automotive vehicle 1 within the traffic lane, etc.

The automobile advancing path estimation based on side wall data of guard rails, curbstones, etc.—side wall data of both the left and the right, or one side of the left-right, is gotten. If the shape of the traffic lane in which the automotive vehicle 1 is traveling can be estimated, the automobile advancing path is formed to go parallel with the side wall, taking into consideration the automotive vehicle's 1 width, the present position of the automotive vehicle 1 within the traffic lane, etc.

The automobile advancing path estimation based on the preceding vehicle locus—the automobile advancing path is estimated based on the past traveling loci of preceding vehicles extracted from within the solid object data.

The automobile advancing path estimation based on the traveling loci of the automotive vehicle 1—the automobile advancing path is estimated based on the automotive vehicle's 1 driving condition.

For example, the automobile advancing path is estimated with the following method, with the yaw rate as γ, the automobile speed as Vo, and the handle angle as θH.

First, it is determined whether the yaw rate sensor 13 is effective. It the yaw rate sensor 13 is effective, the turning curvature Cua is calculated as in the following expression (1).

$$Cua = \frac{\gamma}{Vo} \quad (1)$$

On the other hand, if the yaw rate sensor 13 is not valid, a judgment is made as to whether or not the turn steering, for which the steering angle δ can be obtained from the handle angle θH, is being performed at a greater than a fixed value (for example, 0.57 degrees). If the turn steering is being performed at a steering angle δ of greater than 0.57 degrees, then the current turning curvature Cua is calculated as in, for example, the following expressions (2), (3), using the steering angle δ and the automobile speed Vo.

$$Re = (1 + A \cdot V^2) \cdot \left(\frac{L}{\delta}\right) \quad (2)$$

$$Cua = \frac{1}{Re} \quad (3)$$

Here, Re is the turning radius, A is the vehicle's stability factor, and L is the wheel base.

Furthermore, if the steering angle δ is smaller than 0.57 degrees, then the current turning curvature is made to be 0 (straight travel condition).

In this manner, an average turning curvature is calculated from turning curvatures during a previously fixed time period (for example, about 0.3 seconds), which includes the current turning curvature Cua, and the automobile advancing path is estimated.

Still further, even if the yaw rate sensor 13 is effective and the current turning curvature Cua is calculated according to the foregoing expression (1), if the steering angle δ is less than 0.57 degrees, it may be desirable to correct the current turning curvature Cua to be 0 (straight travel condition).

After designating the automobile advancing path, estimated in the above-mentioned manner, as the center, then approximately left-right 1.1 m is established, for example, as a travel area of the vehicle.

The handling of image data from the stereo camera 3 of the stereo image recognition device 4, is done as follows.

First, regarding the stereo image pair of the automotive vehicle 1, acquired by the CCD camera of the stereo camera 3, handling is performed to look for distance, information, from the quantity of differences in the corresponding locations, via the triangulation principle. Then, a distance image is generated, which expresses the three-dimensional distance distributions.

Based on this data, well-known grouping handling is performed. They are compared to frames (windows) of three-dimensional road shape data, side wall data, solid object data, etc., that has been memorized beforehand. Then, white line data, side wall data side as guard rails, curbstones, etc. existing along the road, solid object data of vehicles, etc. are extracted.

For the white line data, side wall data, solid object data extracted in this manner, different numbers are assigned to each of such data. Still further, regarding the solid object data, they are classified and outputted as stationary objects that are stopped or forward moving objects that are moving in roughly the same direction as the automotive vehicle 1. Such classifications are made from the relationships between the change amounts of relative distances from the automotive vehicle 1 and the vehicle speed of the automotive vehicle 1.

And, as an example, among forward moving objects projected within the automotive travel area, a solid object that is detected continuously for a fixed period of time, and that is nearest to the automotive vehicle 1, is registered as the preceding vehicle.

In this manner, according to this description of a preferred embodiment, a forward information recognition unit and a preceding vehicle information detection unit are arranged through the stereo camera 3 and the stereo image recognition device 4.

On the other hand, for the detection of the driver's eye motions in this description of a preferred embodiment, such detection is done through the so-called pupil/cornea reflection method. Therefore, the view camera 5 is a camera having infrared CCD, and the infrared lamp 6 is an LED lamp.

Also, the eye condition detection device 7 detects the eye movements via the view camera 5 detecting the pupil center and making the pupil center the reference. Simultaneously, the view camera 5 detects the parallel movements of a virtual image from the infrared lamp 6 on the cornea, due to the different rotational centers of the cornea and the eyeball as well as to the eyeball motions.

Additionally, the detection of the eye motions may not be limited to such detection methods and it may be desirable to detect eye motions through other detection methods, if possible (EOG (Electro-Oculography)), sclera reflection method, cornea reflection method, search coil method, etc.).

In other words, the view camera 5, the infrared lamp 6, and the eye condition detection device 7 are arranged as the eye motion detection unit.

The control unit 8 has inputted to it the automobile advancing path, travel area, preceding vehicle information, solid object information other than the preceding vehicle from the stereo image recognition device 4, and signals (an angle as the unit) of the drivers' eye motions from the eye condition detection device 7, and the automobile speed from the vehicle speed sensor 11.

Figure 3:
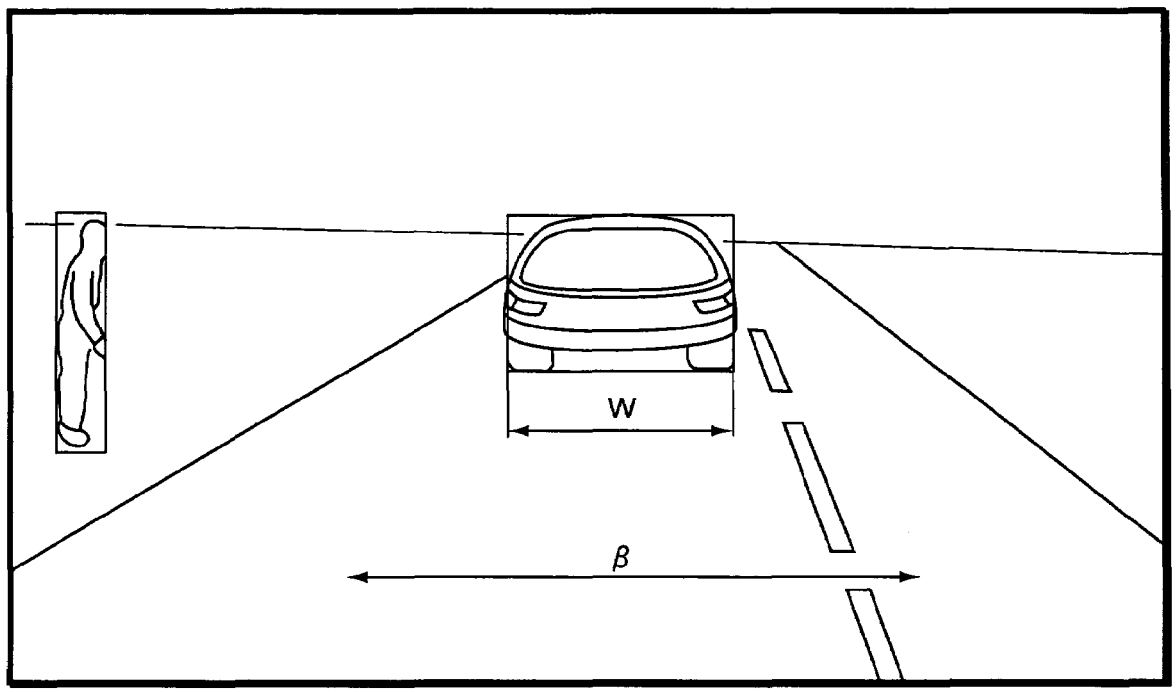
FIG. 3 is an explanatory drawing of eye motion dispersion value within a frontward view and a width of a preceding vehicle.
Figure 4:
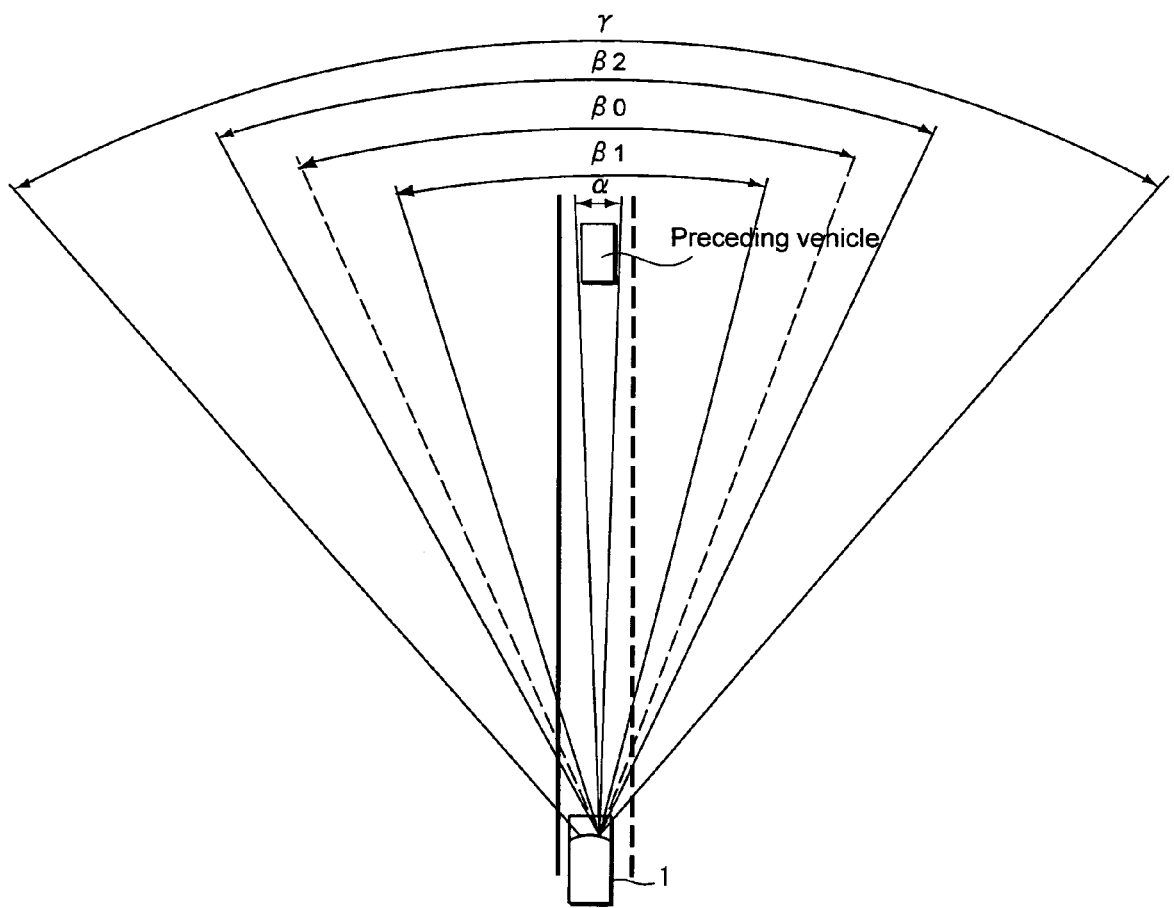
FIG. 4 is an explanatory drawing of examples of various attention estimation values.

At this point, as shown in FIG. 3, the width information of the preceding vehicle from the stereo image recognition device 4 has length units (W in FIG. 3), while the driver's eye motions are given in angle units. Thus, in order to enable the arithmetic, as shown in FIG. 4, the width W of the preceding vehicle is changed to a value a having angle units.

This transformation is as the following expression (4).

$$\alpha = 2 \cdot \arctan\left(\frac{\left(\frac{w}{2}\right)}{L}\right) \quad (4)$$

Here, L is the distance between the vehicles.

In addition, from the signals of the driver's eye motions that are inputted to the control unit 8, a dispersion value β as the value which shows dispersions of the eye motions regarding the preceding vehicle, is calculated. Such calculations of the dispersion β are made according to the following expression (5).

In other words, using the eyeball's turning angle as the basis, a gaze point on a virtual plane is calculated.

The horizontal direction component of the gaze point on the virtual plane is xi, and a certain time period span [t1, t2] (for example, 30-60 seconds) is set. The horizontal direction dispersion value β of the gaze point during that period is:

$$\beta = \left(\frac{1}{(t2-t1+1)}\right) \cdot \sum j = t1^{t2}(xj^2 - xa^2) \quad (5)$$

Here, xa is an average value, obtained as in the following expression (6).

$$xa = \left(\frac{1}{(t2-t1+1)}\right)\sum j = t1^{t2} xj \quad (6)$$

Still further, as the value showing the dispersion of the eye motions regarding the preceding vehicle, the standard deviation sx can also be used.

$$sx = \left(\left(\frac{1}{n}\right) \cdot \sum j = t1^{t2}(xj^2 - xa^2)\right)\frac{1}{2} \quad (7)$$

Then, the ratio of the width α of the preceding vehicle, over the dispersion value β of the driver's eye motions, is calculated as the attention estimation value Sh, which express the attention state. If this attention estimation value Sh is greater than a previously set estimation threshold value Shc (for example, 0.1) (in a case, for example, with the state β1 of FIG. 4), then the attention state of driving with regard to the preceding vehicle is judged to be greater. The later mentioned alarms (forward alarms) focused on the preceding vehicle are moderated in intensity from an alarm performed in a usual state. (Further, alarms focused on frontward obstacles other than the preceding vehicle (sudden appearance alarms) are left as is).

Additionally, if the attention estimation value Sh is smaller than the previously set estimation threshold value Shc, (in a case, for example, with the state β2 of FIG. 4), the attention state of the driving with regard to the preceding vehicle is judged to be a lesser state (aimless state).

At this aimless state, furthermore, an awake estimation value Kh which shows the driver's awake degree, is calculated. If the awake value Kh is greater than a previously set value Khc, an awake time is adjudged and a sudden appearance alarm is moderated in intensity from an alarm performed in a usual state. (Further, the forward alarms are left as is).

Again, at this aimless state, if the awake estimation value Kh is smaller than a previously set value Khc, and a lowered awake state is adjudged, the frontward alarm and the sudden appearance alarms are left as is.

Here, the awake estimation value Kh is calculated as, for example, is the following expression (8).

Kh=(number of times of open-close eye blinking over a long period)/(number of times of overall eye blinking) . . . (8)

Figure 5A:
FIGS. 5A and 5B are explanatory drawings of vehicle motions for an awake state and a less awake state.
Figure 5B:
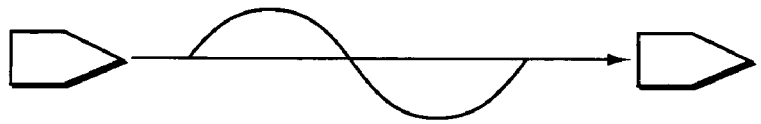

Additionally, rather than estimating the awake degree as the awake estimation value Kh obtained from the above-mentioned expression (8), it can also be judged from the driver's vehicle driving-condition (handle operations), as shown in FIG. 5.

In other words, regarding the awake status, vehicle movements can cause higher frequencies and lower amplitudes, as shown in FIG. 5(*a*). With the lowered awake state, lower frequencies and greater amplitudes may be caused, as shown in FIG. 5(*b*).

It may be desirable to determine this, and evaluate the awake degree.

Then, the control unit 8 may, as an example, perform the following alarms as the frontward alarms focused on the preceding vehicle.

The alarm distance is set according to the relative speed with the preceding vehicle at the front (longer in accordance with faster speeds at which the automotive vehicle 1 approaches the preceding vehicle). When the preceding vehicle exists within this alarm distance, a frontward alarm flag is raised at the control logic, the alarm indicators at the monitor 9 are blinked at a fixed frequency to warn, and also, the sound generation device 10 generates warnings through sounding at each fixed interval.

Additionally, the control unit 8 may, as an example, perform the following sudden appearance alarms focused on front obstacles other than preceding vehicles.

Figure 6:
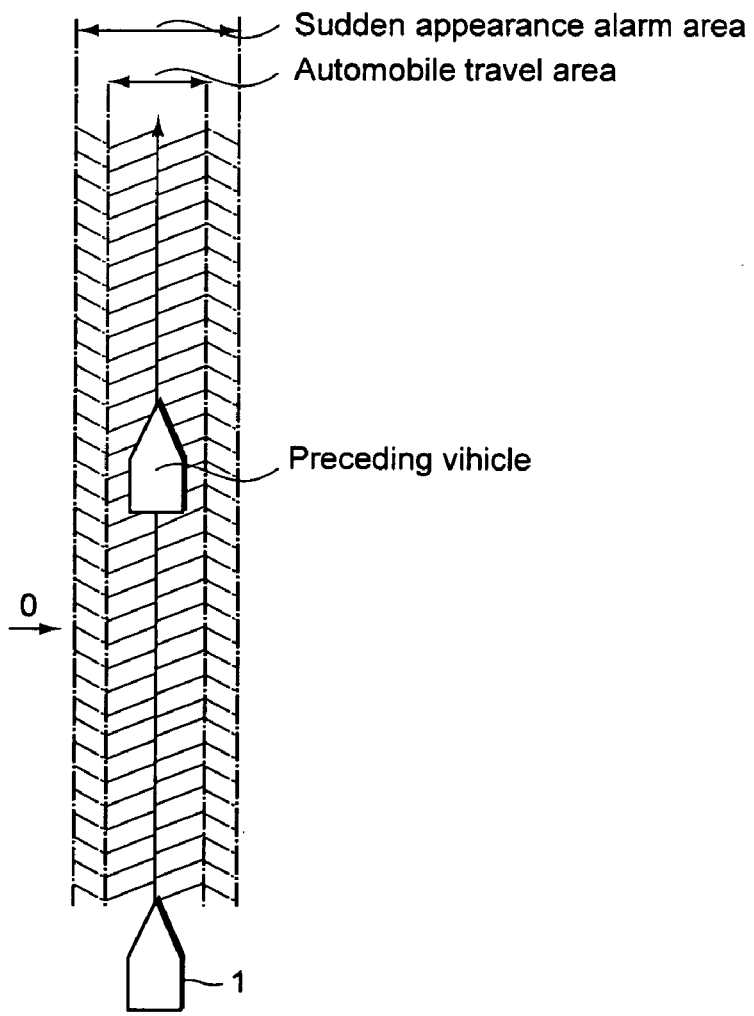
FIG. 6 is an explanatory drawing of the principle of a sudden appearance alarm.

As shown in FIG. 6, a sudden appearance alarm area is set beforehand, outside the automotive vehicle travel area. When a front obstacle exists within this sudden appearance alarm area, the sudden appearance alarm flag is raised at the control logic, the alarm indicators at the monitor 9 are blinked at a fixed frequency to warn, and also, the sound generation device 10 generates warnings through sounding at each fixed interval.

Additionally, the above-mentioned frontward alarms and sudden appearance alarms are at best one example, and other forms of alarm controls may also be desirable.

In this manner, with this description of a preferred embodiment, such functions as the dispersion value calculation unit, the attention state estimation unit, the awake degree estimation unit, and alarm control unit are arranged in the control unit 8.

Figure 2:
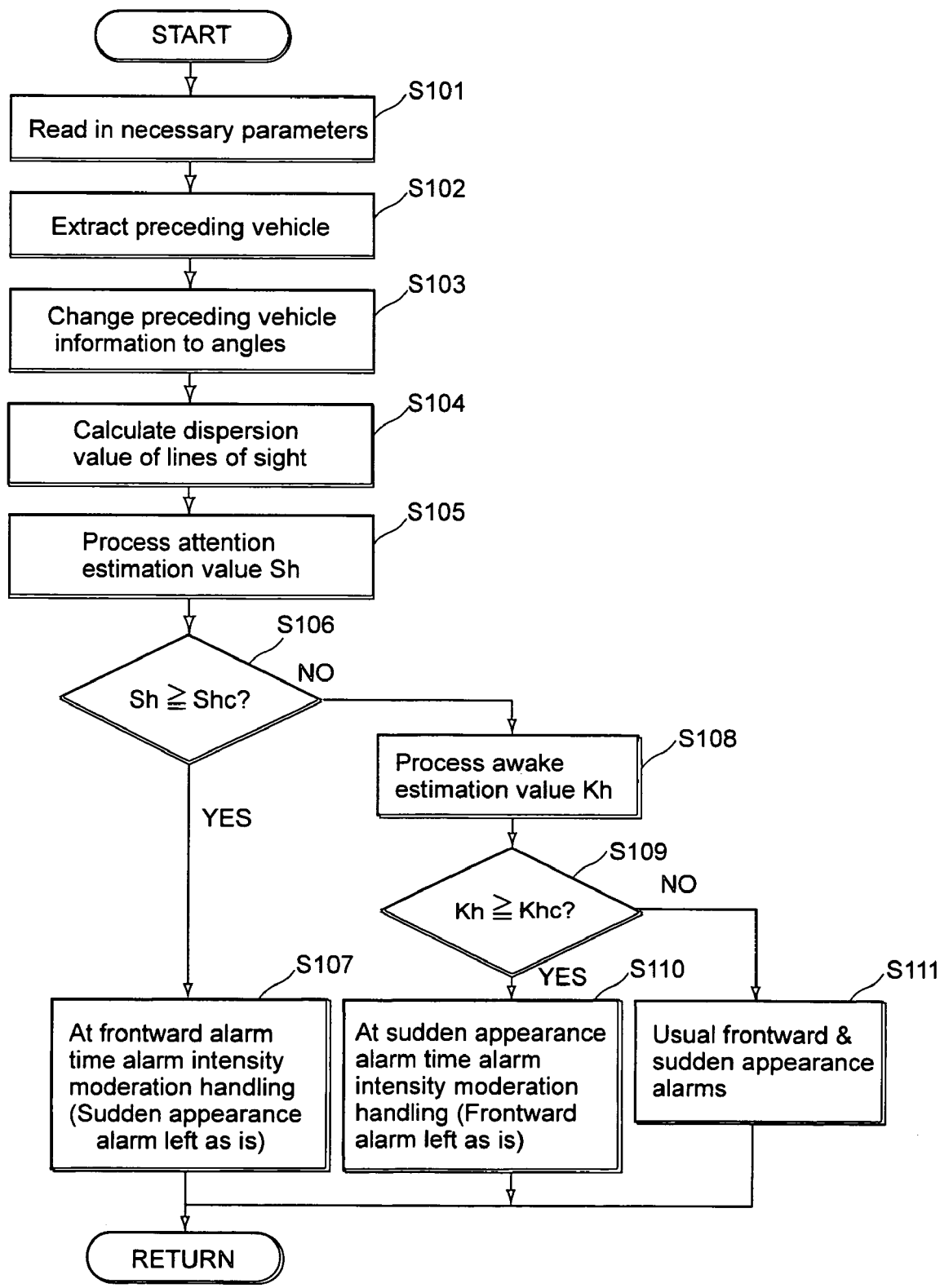
FIG. 2 is a flow chart of the alarm control program.

Next, the above-mentioned alarm control program will be explained with reference to the flow chart of FIG. 2. First, at Step (abbreviated as S in the following) 101, the necessary parameters are read-in.

Subsequently, one advances to S102, and via the stereo camera 3 and the stereo image recognition device 4, a preceding vehicle is extracted. Advancing to S103, the control unit 8 changes the width information of the preceding vehicle to the angle α.

After that, one advances to S104, and the control unit 8 calculates an average value of the driver's eye motions, as well as the dispersion β from that average value. Advancing to S105, the ratio of the width α of the preceding vehicle, over the dispersion value β of the driver's eye motions, is calculated as the attention estimation value Sh, which expresses the attention state (Sh=α/β).

Then, proceeding to S106, the attention estimation value Sh is compared to an estimation threshold value Shc, which was set beforehand. If the attention estimation value Sh is greater than the estimation threshold value Shc, it is determined that the attention state of driving regarding the preceding vehicle is greater, and one advances to S107. The frontward alarms are moderated in intensity from alarm performed in the usual state, and one quits the program (additionally, the sudden appearance alarms are left as is).

Figure 7A:
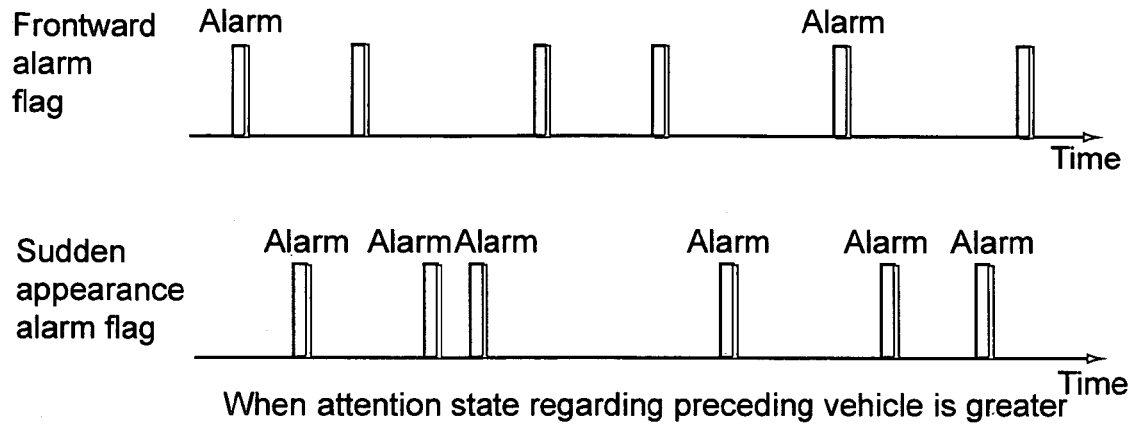
FIGS. 7A-7C are explanatory drawings of intensity moderations of frontward alarms and sudden appearance alarms.

To put it concretely, as shown in FIG. 7(a), even if the frontward alarm flag is raised, intensity moderation is done so that all alarms are. not worked. In addition, instead of a moderation unit as shown in FIG. 7(a), it may also be desirable to lengthen the blinking intervals for the alarm displays on the monitor 9, or reduce the frequency of alarms given out by the sound generation device 10, etc.

In other words, with the current condition, it can be thought that the driver is paying enough attention to the preceding vehicle, and if the frontward alarm is performed as usual, it may conversely be felt to be troublesome. Therefore, by alleviating the frontward alarms, one can prevent interfering with such a driver more than as necessary.

One the other hand, as the result of the determination at S106, if the attention estimation value Sh is judged to be smaller than the estimation threshold value Shc, one judges that the attention state of driving with regard to the preceding vehicle is not greater (aimless state). Advancing to S108, the awake estimation value Kh is calculated through the above-mentioned expression (5).

Then, one advances to S109, and the awake estimation value Kh is compared to value Khc, which has been previously set. If it is determined that the awake estimation value Kh is greater than the set value Khc, an awake time is adjudged, and one advances to S110. The sudden appearance alarm is moderated in intensity from an alarm performed in the usual alarm state, and one quits the program (additionally, the frontward alarm is left as is).

Figure 7B:
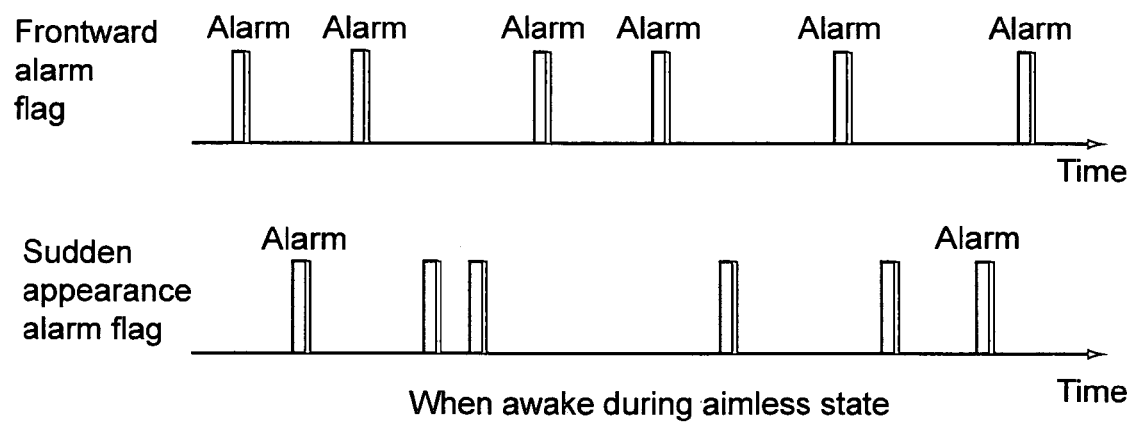

To put it concretely, as shown in FIG. 7(b), even if the sudden appearance alarm flag is raised, intensity moderation is done so that all alarms are not worked.

In addition, instead of a moderation unit, it may also be desirable to lengthen the blinking intervals for the alarm displays on the monitor 9, or reduce the frequency of alarms given out by the sound generation device 10, etc.

In other words, with the current condition, it can be thought that the driver is paying enough attention to obstacles other than the preceding vehicle, and if the sudden appearance alarm is performed as usual, it may conversely be felt to be troublesome.

Therefore, by moderating the sudden appearance alarms, one can prevent interfering with such a driver more than as necessary.

Figure 7C:
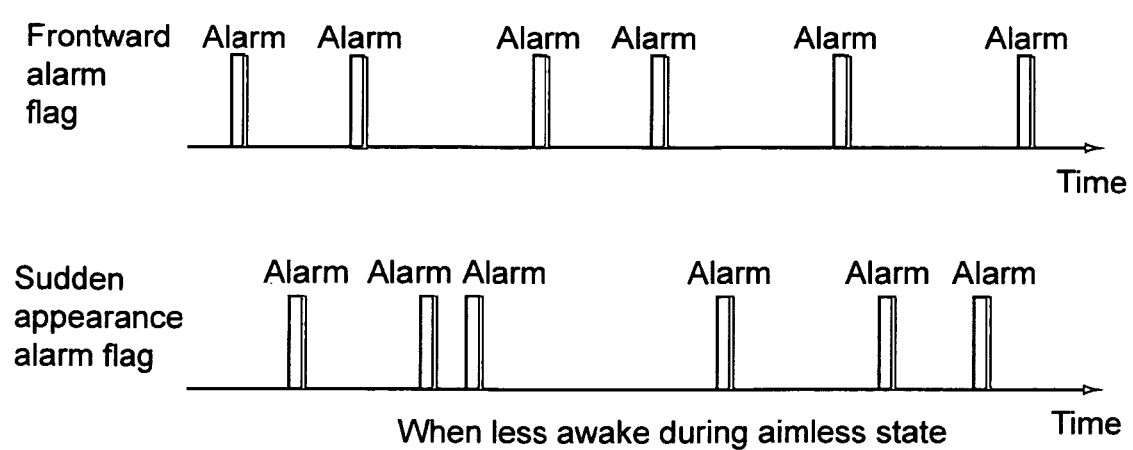

Additionally, if as a result of the judgment at S109, it is determined that the awake estimation value Kh is lower than the set value Khc, a lowered awake time is adjudged, and one proceeds to S111. Both the frontward alarms and the sudden appearance alarms are operated as usual, and one quits the program. In other words, as shown in FIG. 7(c), when the frontward alarm flag and the sudden appearance alarm flag are raised, all alarms are worked.

Still further, in this condition, it is desirable to work the alarms toward the driver as quickly as possible. Thus, one may make the periods of blinking of the alarm displays on the monitor 9 faster according to the smallness of the awake estimation value Kh, the frequency of the alarms given from the sound generation device 10 may be raised, etc.

In this way, with the present description of a preferred embodiment, if the attention estimation value Sh is greater than the estimation threshold value Shc, it is judged that the attention state of driving with regard to the preceding vehicle is greater, and the frontward alarms are moderated in intensity from alarms performed in the usual state.

Then again, if the attention estimation value Sh is judged to be less than the estimation threshold value Shc, it is determined that attention state of driving with regard to the preceding vehicle is lesser (aimless state). Then, if the awake estimation value Kh is determined to be greater than the set value Khc, an awake time is adjudged. The sudden appearance alarms are moderated in intensity from alarms operated in the usual state. If the awake estimation value Kh is determined to be lower than the set value Khc, a lowered awake time is adjudged. Then, both the frontward alarms and the sudden appearance alarms are operated as usual.

Therefore, when a preceding vehicle exists, it becomes possible to accurately determine changes in the attention of the driver, and perform alarms appropriately with regard to the driver.

Furthermore, with the present description of a preferred embodiment, if the attention estimation value Sh is determined to be smaller than the estimation threshold value Shc, the alarm control is changed so that the cases are distinguished according to the awake evaluation value Kh. However, according to the method, one may still further simplify by omitting the distinguishing of cases by the awake estimation value Kh, and operate the sudden appearance alarms as moderated in intensity from alarms performed in the usual state.

Additionally, with the present description of a preferred embodiment, one needs to convert the preceding vehicle's width W to an angle, in order to obtain the attention estimation value Sh. Conversely, if the dispersion $\beta$ of the driver's eye motions are converted to the length dimensions of the preceding vehicle location, and the attention estimation value Sh is obtained, then similar effects can be provided.

The above description provides an exemplary first mode of the present invention. The following describes another form of alarm control programming, as well as other modes of accurately determining a driving state of the driver.

Figure 8:
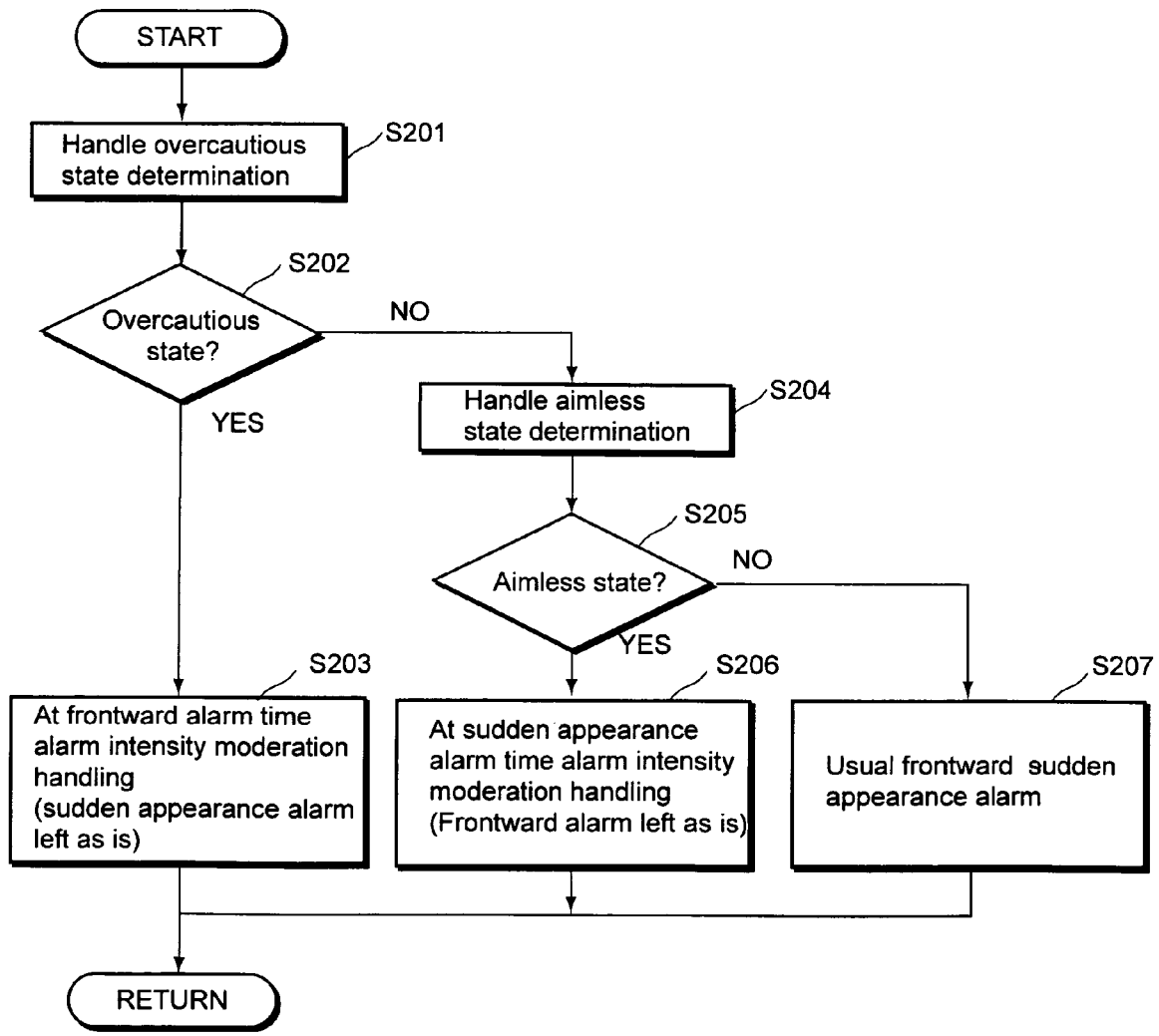
FIG. 8 is a flow chart of the alarm control program.

This other exemplary mode of the driving support equipment of the present invention is arranged will be described below with reference to the flow chart of FIG. 8, which shows its alarm control program. In this mode, the control unit 8 determines whether the attention state of driving regarding the preceding vehicle is a greater, overcautious state, or whether the attention state regarding objects other than the preceding vehicle is a greater, aimless state, or whether another attention state is involved.

Upon determination of an overcautious state in a second preferred mode of the present invention, one following the below-mentioned overcautious state determination handling routine of FIG. 9. If the following 2 conditions are both satisfied, then the overcautious state is determined.

Figure 11:
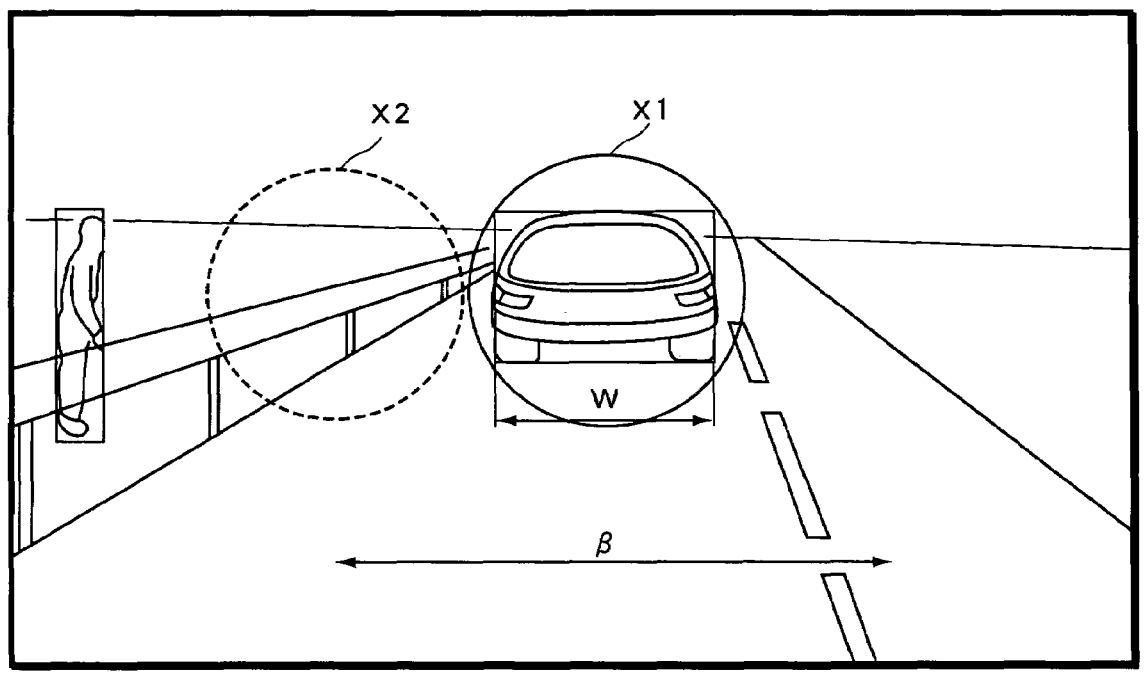
FIG. 11 is an explanatory drawing of the determination area for the overcautious state, based on eye motions within the front sight and the preceding vehicle.

First, as a first condition, as shown in FIG. 11, the preceding vehicle is made the standard (the center of the preceding vehicle's window is made the standard). An overcautious state determination area X1 with radius 5 deg is set.

As circumstances set beforehand, for example, eye stoppage time periods within the overcautious state determination area X1 during a 10 second period after starting driving and detecting a preceding vehicle, is made the standard stoppage period TB. Also, an eye stoppage period Ts within the overcautious state determination area X1 during the past 10 seconds is set.

Then, a ratio of stoppage periods Tr (=Ts/TB), which is the ratio of the stoppage period Ts with the standard stoppage period TB, is calculated. If this stoppage period ratio Tr is greater than a threshold value Trc1 (for example, 0.5), which was set beforehand, then an overcautious state is adjudged.

Additionally, the present mode of the present invention uses 1 overcautious state determination area X1. However, one can also have a plurality. For example, one can consider the area X2 of FIG. 11 (an area having the center of a guard rail at the preceding vehicle's side, with a radius 5 deg), and obtain the stoppage period ratio from such 2 areas.

Figure 13:
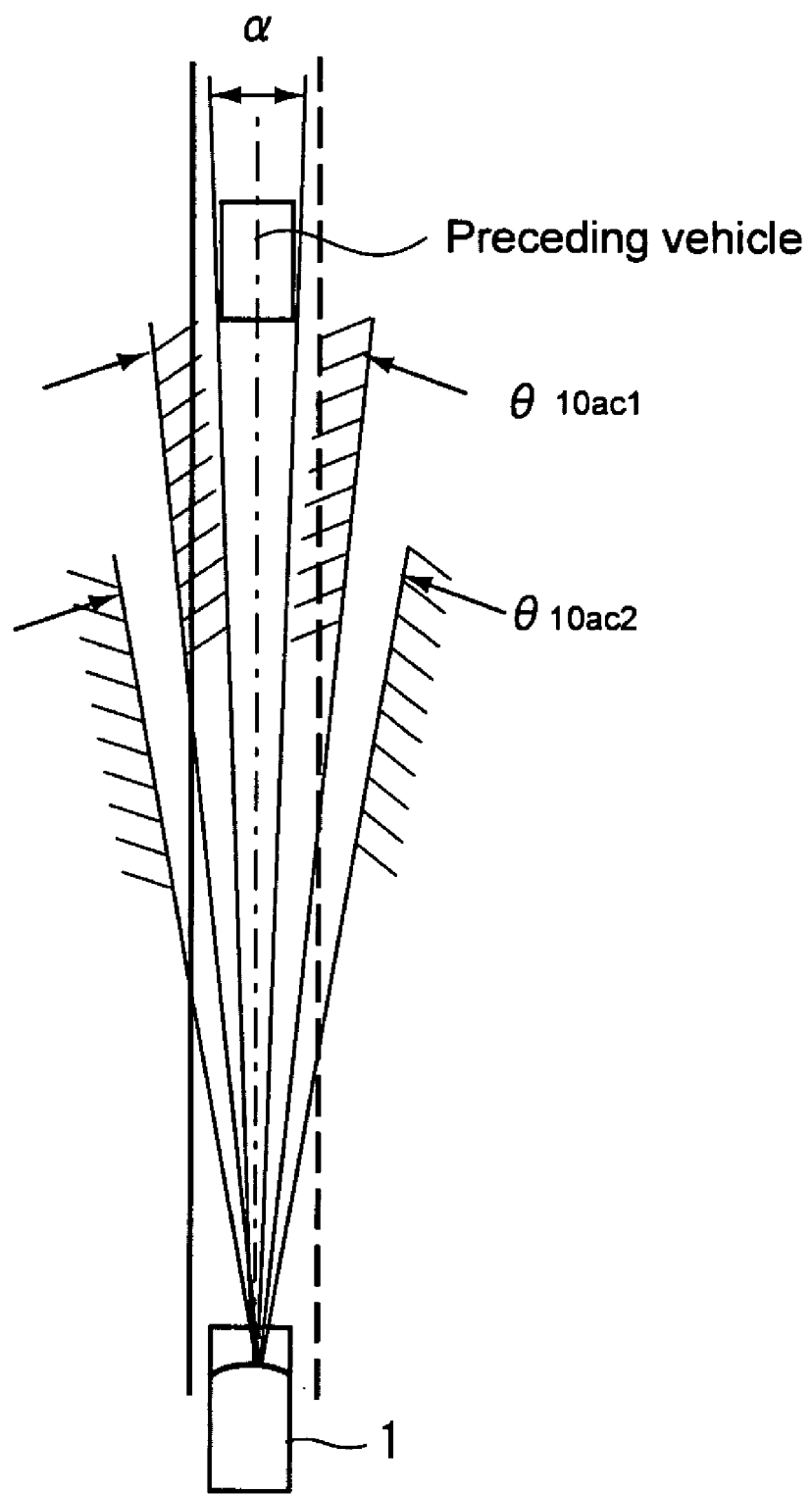
FIG. 13 is an explanatory drawing of the eye angles and threshold value, from the driver to the preceding vehicle.

Furthermore, as the second condition, as shown in FIG. 13, the preceding vehicle during the past 10 seconds can be made the standard (the center of the preceding vehicle window is made the standard). If the average eye angle θ10a is less than a threshold value θ10ac1 (for example, 10 deg) that has been set beforehand, then an overcautious state is determined.

On the other hand, for determining an aimless state in this second preferred mode of the present invention, if the following 2 conditions are both satisfied, in accordance with the below-mentioned aimless state determination handling routine of FIG. 10, then an aimless state is adjudged.

Figure 12A:
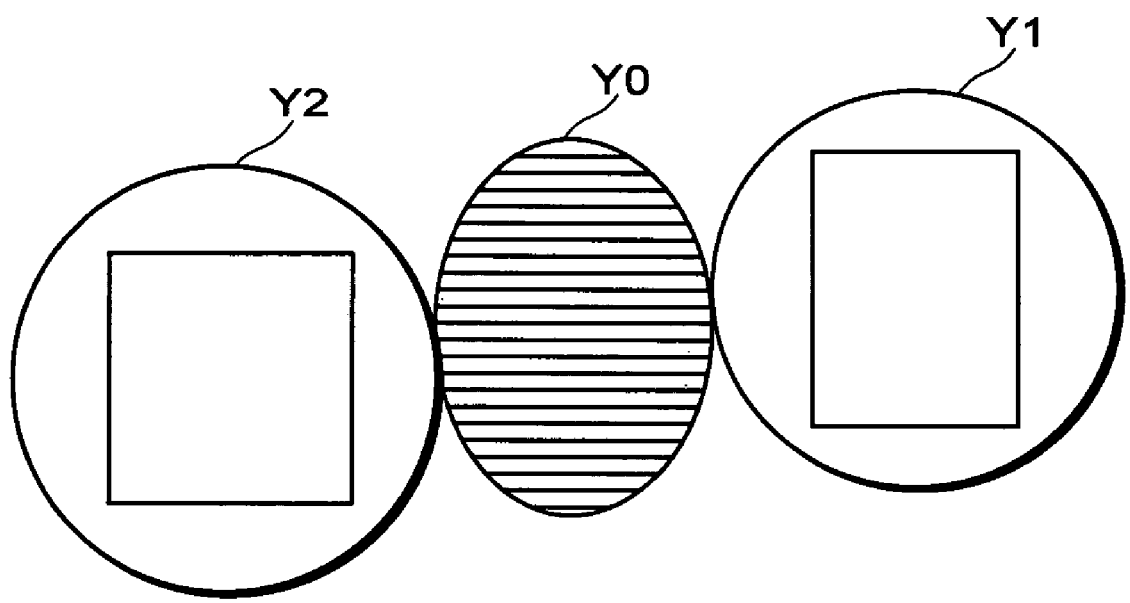
FIG. 12 is an explanatory drawing of the determination area for the aimless state.

First, as a first condition, as shown in FIG. 12(a), the preceding vehicle is made the standard (the center of the preceding vehicle window is made the standard). Then, an area Y1 with radius 5 deg, and an area Y2 having radius 5 deg with other solid objects (for example, solid objects such as a guard rail at the side of the preceding vehicle, road signs, vehicles, etc.) as a standard are established. In between those areas, an ellipse or circle-shaped area that touches upon area Y1 and area Y2, is set as the aimless state determination area Y0.

As circumstances set beforehand, for example, eye stoppage time periods within the aimless state determination area Y0, during a 10 second period after starting driving and detecting a preceding vehicle, is made the standard stoppage period TB. Also, an eye stoppage period Ts within the aimless state determination area Y0 during the past 10 seconds is set.

Then, a ratio of stoppage periods Tr (=Ts/TB), which is the ratio of the stoppage period Ts with the standard stoppage period TB, is calculated. If this stoppage period ratio Tr is greater than a threshold value Trc2 (for example, 0.5), which was set beforehand, then an aimless state is adjudged.

Figure 12B:
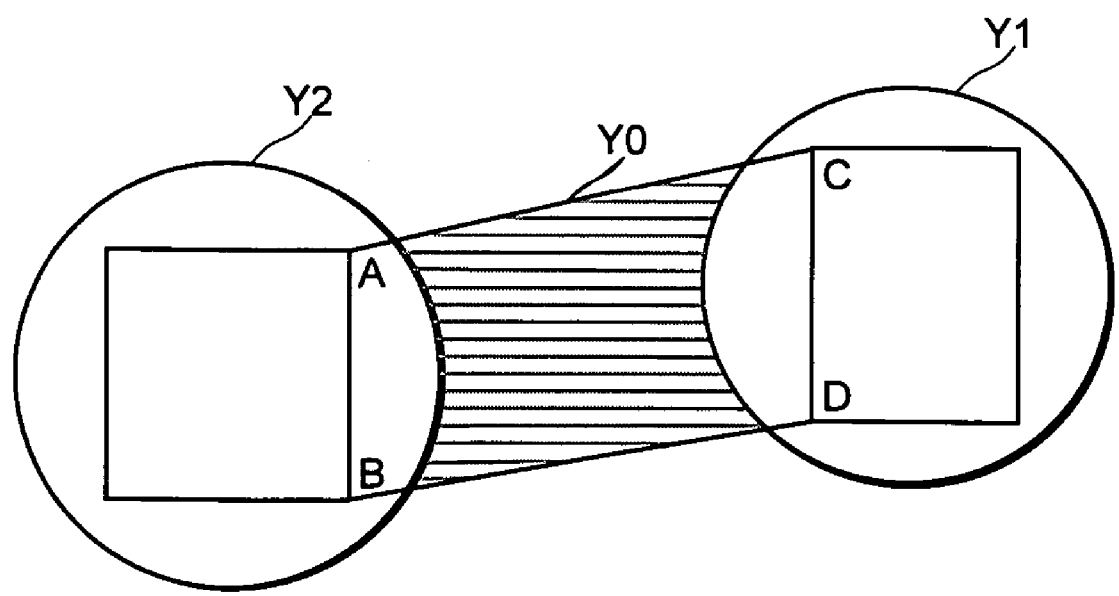

In addition, the aimless state determination area Y0 may also be set as shown in FIG. 12(b). In other words the aimless state determination area Y0 of FIG. 12(b) has the upper right limit point of the left side solid object as point A, the lower right limit point as point B, the upper left limit point of the right side solid object as point C, and the lower left limit point as point D.

Then, from the area shaped by point A, point B, point C, and point D, a portion excluding the area Y1, made based on the right side solid object, and also excluding the area Y2, made based on the left side solid object, is established as the aimless state determination area Y0.

Furthermore, as a second condition, as shown in FIG. 13, the preceding vehicle during the past 10 seconds can be made the standard (the center of the preceding vehicle window is made the standard). If the average eye angle θ10a is greater than a threshold value θ10ac2 (for example, 15 deg) that has been set beforehand, then an aimless state is determined.

If, as a result of the foregoing overcautious state determination, an overcautious state is adjudged, then the below-mentioned alarm (frontward alarm), focused on the preceding vehicle, is moderated in intensity from an alarm performed in a usual state. (Additionally, alarms (sudden appearance alarms) focused on frontward obstacles other than the preceding vehicles, are left as is).

Conversely, if, as a result of the aimless state determination, an aimless state is adjudged, then the below-mentioned sudden appearance alarm is moderated in intensity from an alarm performed in a usual state. (Additionally, the frontward alarm is left as is).

Then again, if the condition is neither an overcautious state nor an aimless state, the frontward alarm and the sudden appearance alarm are left as is.

As the frontward alarm focused on the preceding vehicle, the control unit 8 performs, for example, an alarm as follows. The alarm distance is set according to the relative speed with the preceding vehicle at the front (longer in accordance with faster speeds at which the automotive vehicle 1 approaches the preceding vehicle). When the preceding vehicle exists within this alarm distance, a frontward alarm flag is raised at the control logic, the alarm indicators at the monitor 9 are blinked at a fixed frequency to warn, and also, the sound generation device 10 generates warnings through sounding at each fixed interval.

Additionally, the control unit 8 may, as an example, perform the following sudden appearance alarms focused on front obstacles other than preceding vehicles.

As shown in FIG. 6, a sudden appearance alarm area is set beforehand, outside the automotive vehicle travel area. When a front obstacle exists within this sudden appearance alarm area, the sudden appearance alarm flag is raised at the control logic, the alarm indicators at the monitor 9 are blinked at a fixed frequency to warn, and also, the sound generation device 10 generates warnings through sounding at each fixed interval.

Additionally, the above-mentioned frontward alarms and sudden appearance alarms are at best one example, and other forms of alarm controls may also be desirable.

In this manner, with this description of a preferred embodiment, such functions as the area establishment unit, driving state determination unit, and alarm control unit are arranged in the control unit 8.

Next, the above-mentioned alarm control program will be explained with reference to the flow chart of FIG. 8. First, at Step (abbreviated as S in the following) 201, the overcautious determination handling is carried out.

This overcautious state determination handling will be further explained with reference to the below-mentioned overcautious state determination handling routine of FIG. 9.

Next, one advances to S202, and with the results of the overcautious state determination handling of S201, it is determined whether or not the driving attentiveness state with regard to the preceding vehicle is greater and thus, an overcautious state. If it is an overcautious state, one advances to S203. The frontward alarm is moderated in intensity from an alarm performed in a usual state, and one quits the program. (Additionally, the sudden appearance alarm is left as is).

To put it concretely, as shown in FIG. 7(a), even if the frontward alarm flag is raised, intensity moderation is done so that all alarms are not worked.

In addition, instead of a moderation unit as shown in FIG. 7(a), it may also be desirable to lengthen the blinking intervals for the alarm displays on the monitor 9, or reduce the frequency of alarms given out by the sound generation device 10, etc.

In other words, with the current condition, it can be thought that the driver is paying enough attention to the preceding vehicle, and if the frontward alarm is performed as usual, it may conversely be felt to be troublesome. Therefore, by alleviating the frontward alarms, one can prevent interfering with such a driver more than as necessary.

Then again, if one determines that an overcautious state does not exist, as a result of the determination of S202 and the result of the overcautious state determination handling of S201, then one advances to S204 and carries out the aimless state determination handling.

This aimless state determination handling will be further explained with reference to the below-mentioned aimless state determination handling routine of FIG. 10.

Next, one advances to S205, and with the results of the aimless state determination handling of S204, it is determined whether or not the driving attentiveness state with regard to the preceding vehicle is weak and thus, an aimless state. If it is an aimless state, one advances to S206. The sudden appearance alarm is moderated in intensity from an alarm operated in a usual state, and one quits the program. (Additionally, the frontward alarm is left as is).

To put it concretely, as shown in FIG. 7(b), even if the sudden appearance alarm flag is raised, intensity moderation is done so that all alarms are not worked.

In addition, instead of a moderation unit as shown in FIG. 7(b), it may also be desirable to lengthen the blinking intervals for the alarm displays on the monitor 9, or reduce the frequency of alarms given out by the sound generation device 10, etc.

In other words, with the current. condition, it can be thought that the driver is paying enough attention to obstacles other than the preceding vehicle, and if the sudden appearance alarm is performed as usual, it may conversely be felt to be troublesome. Therefore, by alleviating the sudden appearance alarms, one can prevent interfering with such a driver more than as necessary.

Additionally, if as a result of the judgment at S205, and the result of the aimless state determination handling of S204, the condition is determined not to be an aimless state, then one advances to S207. Both the frontward alarm and the sudden appearance alarm are operated as usual, and one quits the program.

In other words, as shown in FIG. 7(c), when the frontward alarm flag and the sudden appearance alarm flag are raised, all alarms are worked.

Figure 9:
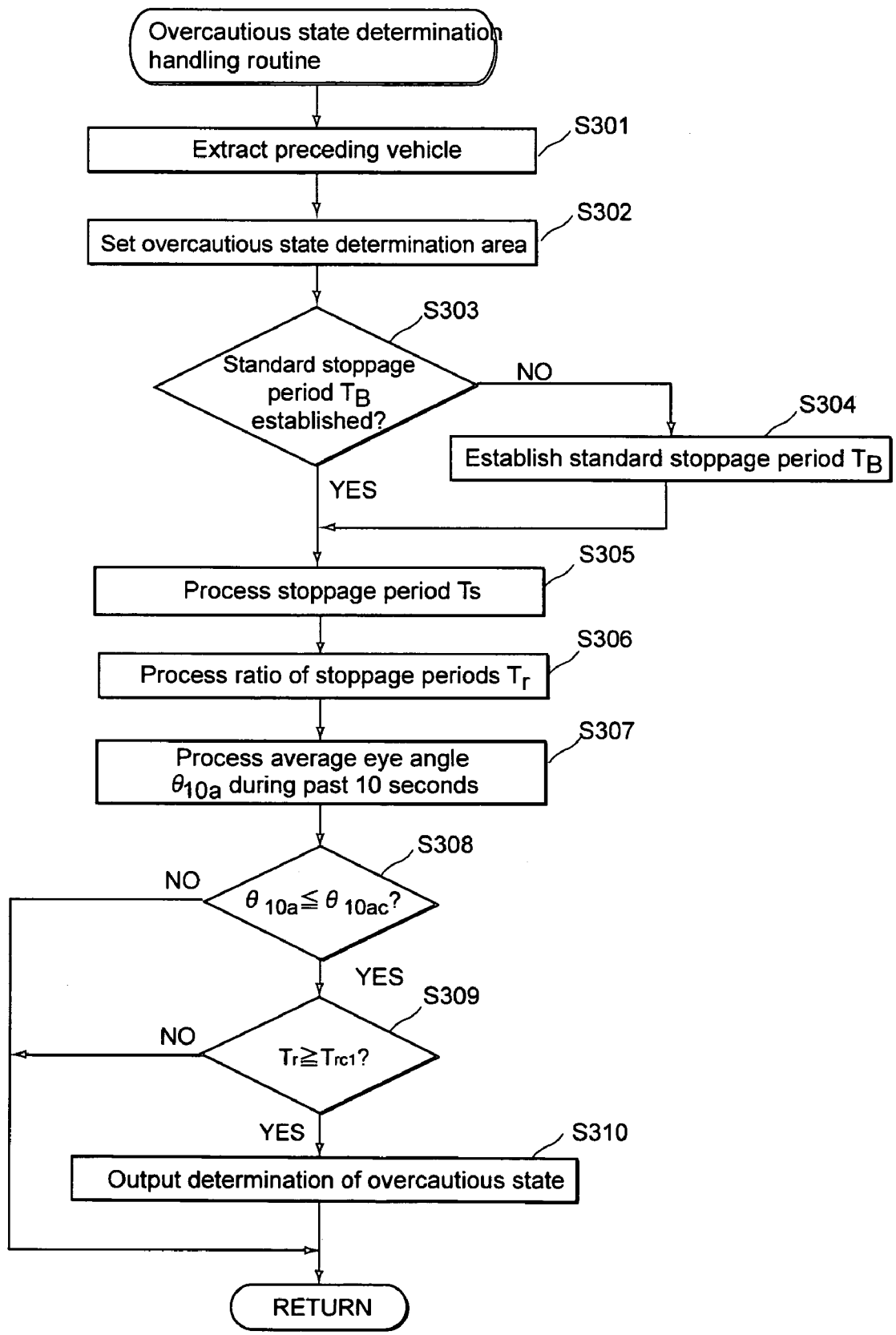
FIG. 9 is a flow chart of the overcautious state determination handling routine.

Next, FIG. 9 shows the overcautious state determination handling routine. First, the extraction of the preceding vehicle is done at S301.

Then, proceeding to S302, as shown in FIG. 11, the preceding vehicle is made the standard (the center of the preceding vehicle's window is made the standard). An overcautious state determination area X1 with radius 5 deg is set. In addition, as mentioned above, the overcautious state determination area may also be established with the 2 areas X1 and X2, of FIG. 11.

Subsequently, one advances to S303. As circumstances set beforehand, for example, it is determined whether or not a standard stoppage period TB, which is the eye stoppage time periods within the overcautious state determination area X1, during a 10 second period after starting driving and detecting a preceding vehicle, has been established.

If, the result of the S303 determination is that the standard stoppage period TB has not been established, the standard stoppage period TB is set at S304 and then, one advances to S305. If the standard stoppage period TB has already been established, then one simply proceeds to S305 as is.

At S305, one calculates an eye stoppage period Ts, occurring during the past 10 seconds within the overcautious state determination area X1.

Then, proceeding to S306, a ratio of stoppage periods Tr (=TsTB), which is the ratio of the stoppage period Ts with the standard stoppage period TB, is calculated.

After that, one advances to S307, and an average eye angle θ10a, with the preceding vehicle during the past 10 seconds as the standard (the center of the preceding vehicle window is made the standard), is calculated.

Proceeding to S308, the average eye angle θ10a is compared to a threshold value θ10ac1 (for example, 10 deg) that has been set beforehand, and if the average eye angle θ10a is less than the previously set threshold value θ10ac1, one proceeds to S309. The ratio of stoppage periods Tr is compared to a threshold value Trc1 (for example, 0.5), which has been set beforehand. If the ratio of stoppage periods Tr is greater than the previously set threshold value Trc1, one proceeds to S310. There, a determination of an overcautious state is output, and one leaves the routine.

On the other hand, there may be the case where the result of the comparison of the average eye angle θ10a with the previously set threshold value θ10ac1 at S208, is that the average eye angle θ10a is greater than the previously set threshold value θ10ac1. Or, there may be the case where the result of the comparison of the ratio of stoppage periods Tr with-the previously set threshold value Trc1 at S309, is that the ratio of stoppage periods Tr is smaller than the threshold value Trc1. In such cases, rather than determining an overcautious state, one simply quits the routine as is.

Figure 10:
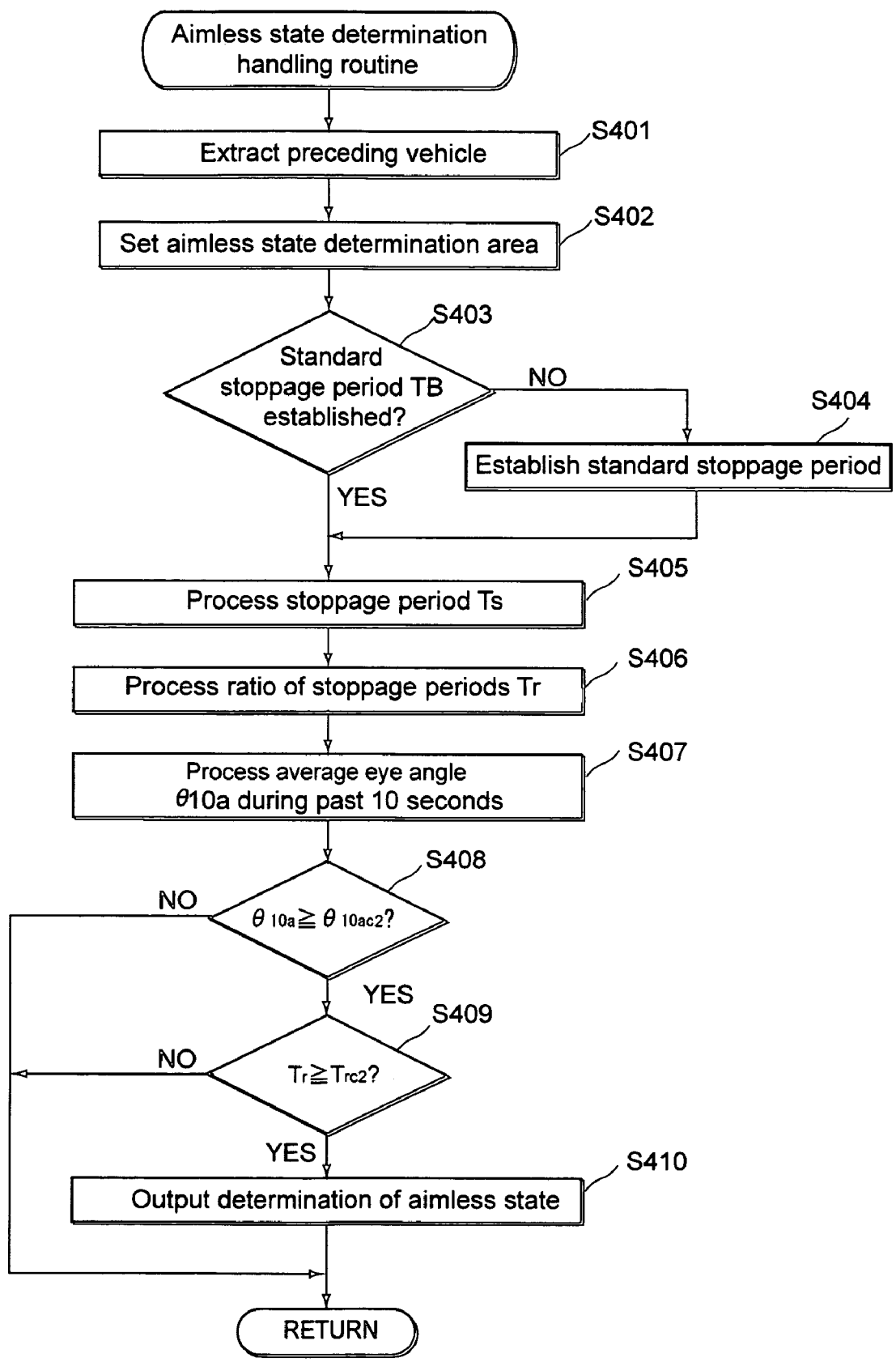
FIG. 10 is a flow chart of the aimless state determination handling routine.

Next, FIG. 10 shows the aimless state determination handling routine. First, the extraction of the preceding vehicle is done at S401.

Next, one advances to S402. As shown in FIG. 12(a), an area Y1 having the preceding vehicle as the standard (the center of the preceding vehicle window as the standard) with radius 5 deg, and an area Y2 having other solid objects (for example, solid objects such as a guard rail at the side of the preceding vehicle, road signs, vehicles, etc.) as the standard and with radius 5 deg, are established. In between those areas, an ellipse or circle-shaped area that touches upon area Y1 and area Y2, is set as the aimless state determination area Y0. In addition, the aimless state determination area Y0 may also be set as shown in FIG. 12(b).

Subsequently, one advances to S403. As circumstances set beforehand, for example, it is determined whether or not a standard stoppage period TB, which is the eye stoppage time periods within the aimless state determination area Y0, during a 10 second period after starting driving and detecting a preceding vehicle, has been established.

If, the result of the S403 determination is that the standard stoppage period TB has not been established, the standard stoppage period TB is set at S404 and then, one advances to S405. If the standard stoppage period TB has already been established, then one simply proceeds to S405 as is.

At S405, one calculates an eye stoppage period Ts, occurring during the past 10 seconds within the aimless state determination area Y0.

Then, proceeding to S406, a ratio of stoppage periods Tr (=Ts/TB), which is the ratio of the stoppage period Ts with the standard stoppage period TB, is calculated.

After that, one advances to S407, and an average eye angle θ10a, with the preceding vehicle during the past 10 seconds as the standard (the center of the preceding vehicle window is made the standard), is calculated.

Proceeding to S408, the average eye angle θ10a is compared to a threshold value θ10ac2 (for example, 15 deg) that has been set beforehand, and if the average eye angle θ10a is greater than the previously set threshold value θ10ac2, one proceeds to S409. The ratio of stoppage periods Tr is compared to a threshold value Trc2 (for example, 0.5), which has been set beforehand. If the ratio of stoppage periods Tr is greater than the previously set threshold value Trc2, one proceeds to S410. There, a determination of an aimless state is output, and one leaves the routine.

On the other hand, there may be the case where the result of the comparison of the average eye angle θ10a with the previously set threshold value θ10ac2 at S408, is that the average eye angle θ10a is smaller than the previously set threshold value θ10ac2. Or, there may be the case where the result of the comparison of the ratio of stoppage periods Tr with the previously set threshold value Trc2 at S409, is that the ratio of stoppage periods Tr is smaller than the threshold value Trc1. In such cases, rather than determining an aimless state, one simply quits the routine as is.

According to this description of this second preferred mode of the present invention, one determines, through the eye angles and the ratio of the stoppage periods, the overcautious state which involves a greater driving attentiveness state regarding a preceding vehicle, and also the aimless state, which is a greater driving attentiveness state regarding other than the preceding vehicle. The alarms are varied based on the results of such determinations. Therefore, changes in the driver's attention when the preceding vehicle exists, are precisely judged. Then, it becomes possible to accomplish appropriate alarms with regard to the driver.

In addition, this description of a second preferred mode of the present invention involves determining the overcautious state and the aimless state via the eye angles and the ratio of stoppage periods. However, one may also determine both states via the ratio of stoppage periods only. Then again, one may determine only one of the states via only the ratio of stoppage periods, or, via both the eye angles and the ratio of stoppage periods.

Figure 14:
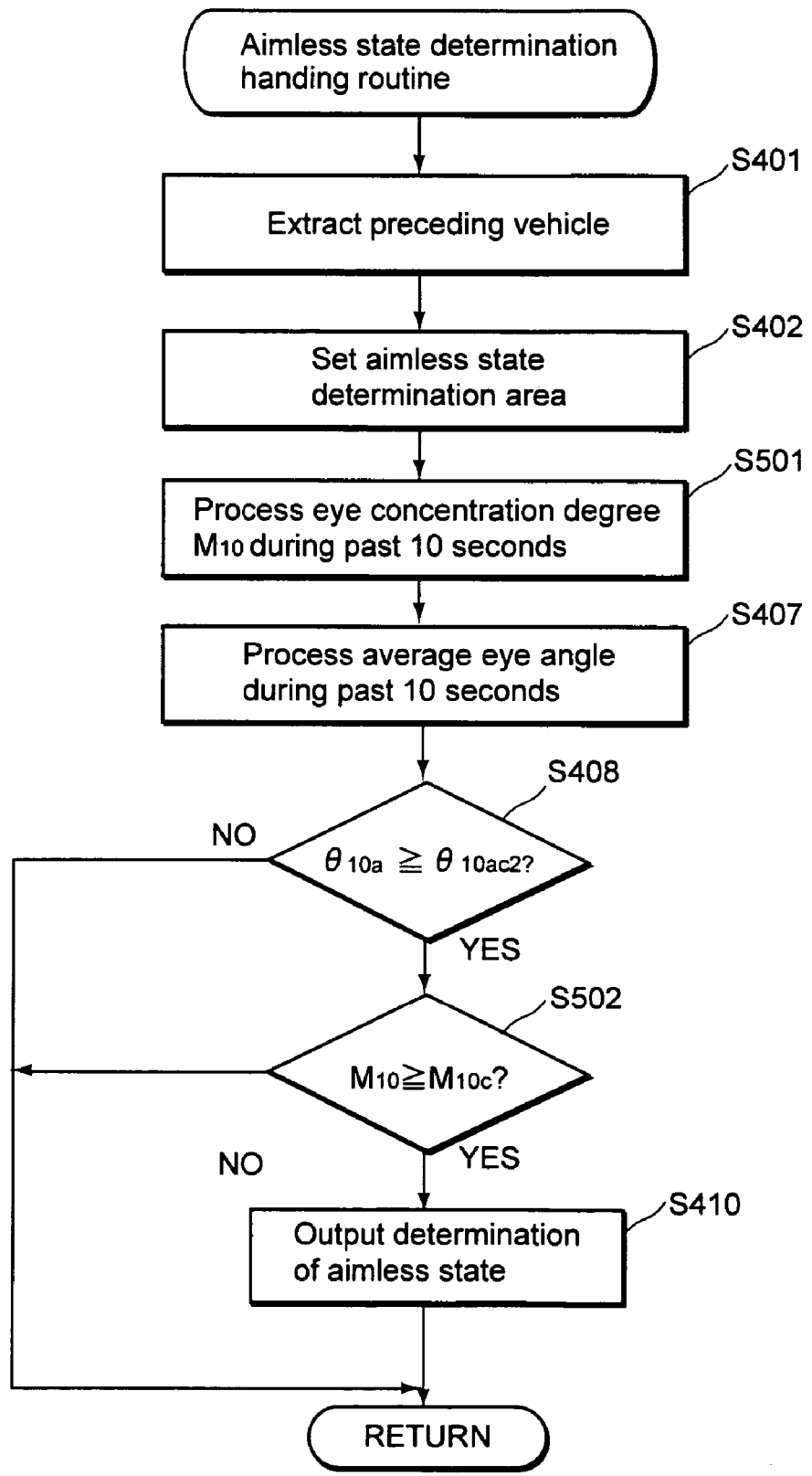
FIG. 14 a flow chart of another mode of the aimless state determination handling routine.

Next, FIG. 14 shows a flow chart of an aimless state determination handling routine, according to yet a third preferred mode of the present invention.

Additionally, with this third preferred mode, the aimless state determination handling differs from the above second mode. Since the other arranged operations are the same as in the second mode, the same reference characters will be used for configurations that are the same, and the explanation will be shortened.

In other words, for the aimless state determination of the third preferred mode, at first, the preceding vehicle is extracted at S401, as shown in the flow chart of FIG. 14.

Next, one advances to S402. As shown in FIG. 12(*a*), an area Y1 having the preceding vehicle as the standard (the center of the preceding vehicle window as the standard) with radius 5 deg, and an area Y2 having other solid objects (for example, solid objects such as a guard rail at the side of the preceding vehicle, road signs, vehicles, etc.) as the standard and with radius 5 deg, are established. In between those areas, an ellipse or circle-shaped area that touches upon area Y1 and area Y2, is set as the aimless state determination area Y0. In addition, as mentioned above, an aimless state determination area Y0 may also be established as shown in FIG. 12(*b*).

Subsequently, one proceeds to S501. One calculates the eye concentration degree during the past 10 seconds, with regard to the aimless state determination area Y0 set at S402—in other words, the frequency of the lines of sights M10.

Next, advancing to S407, the average eye angle θ10a during the past 10 seconds, with the preceding vehicle as the standard (the center of the preceding vehicle window is made the standard), is calculated.

Then, going on to S408, the average eye angle θ10a is compared to a threshold value θ10ac2 (for example, 15 deg) that has been set beforehand, and if the average eye angle θ10a is greater than the previously set threshold value θ10ac2, one proceeds to S502. The eye concentration degree M10 during the past 10 seconds is compared to a threshold value M10c (for example, 50%), which had been set beforehand. If the eye concentration degree M10 for the past 10 seconds is greater than the previously set threshold value M10c, one proceeds to S410. There, an aimless state is determined and outputted, and one quits the routine.

On the other hand, there may be the case where the result of the comparison of the average eye angle θ10a with the previously set threshold value θ10ac2 at S408, is that the average eye angle θ10a is smaller than the previously set threshold value θ10ac2. Or, there may be the case where the result of the comparison of the eye concentration degree for the past 10 seconds at S502 with the previously set threshold value M10c, is that the eye concentration degree M10 is smaller than the previously set threshold value M10c. In such cases, rather than determining an aimless state, one simply quits the routine as is.

According to this description of the third preferred mode of the present invention, one determines, one can precisely determine the attentiveness state with regard to other than preceding vehicles, by way of the eye angles and the eye concentration degree during the past 10 seconds. In this manner, it provides similar effects as the second preferred mode.

Furthermore, with the present description of the various preferred modes, the recognition of a preceding vehicle is accomplished based on images from the stereo camera. However, information from other technologies, such as milli-wave radar and monocular cameras, may also be the basis for such recognitions.

Obviously, many modifications and variations of the present invention are possible in light of the above teachings. It is therefore to be understood that, within the scope of the appended claims, the invention may be practiced otherwise than as specifically described.

What is claimed is:

1. A driving support equipment for a vehicle, comprising:
   a frontward information recognition unit for recognizing environs information at the front of said vehicle;
   a preceding vehicle information detection unit for detecting preceding vehicle information from the environs information at the front of said vehicle;
   an eye motion detection unit for detecting an eye motion of a driver who drives the vehicle;
   a dispersion value processing unit for processing a value showing a dispersion of said eye motion regarding said preceding vehicle based on the preceding vehicle information detected by the preceding vehicle information detection unit and on the eye motion detected by the eye motion detection unit;
   an attention state estimation unit for estimating an attention state of the driver regarding said preceding vehicle, using said value showing the eye motion dispersion; and
   an alarm control unit for varying a vehicle alarm according to said estimated attention state of the driver.

2. A driving support equipment of claim 1,
   wherein if said driving attention state regarding said preceding vehicle, estimated by said attention state estimation unit, is greater than a predetermined estimation threshold value, said driving attention state regarding said preceding vehicle is determined to be greater, and said alarm control unit causes at least an alarm focused on said preceding vehicle, to be moderated in intensity from an alarm performed in a usual state.

3. A driving support equipment for a vehicle according to claim 1,
   wherein if said driving attention state regarding said preceding vehicle, estimated by said attention state estimation tion unit, is lesser than an estimation threshold value which was set beforehand, said driving attention state regarding said preceding vehicle is determined to be lesser, and said alarm control unit causes at least an alarm focused on a frontward obstacle object other than said preceding vehicle, to be moderated in intensity from an alarm performed in a usual state.

4. A driving support equipment for a vehicle of claim 3, further comprising an awake degree estimation unit for estimating an awake degree of the driver when driving the vehicle,
wherein if said driving attention state focused on said preceding vehicle, estimated by said attention state estimation unit, is determined to be lesser, and also, if said awake degree is an awake time that satisfies a condition set beforehand, then said alarm control unit causes at least an alarm focused on a frontward obstruction object other than said preceding vehicle, to be moderated in intensity from an alarm performed in a usual state.

5. A driving support equipment of claim 1, wherein
the value showing the dispersion of said eye motions is either a dispersion value of, or the standard deviation of, the eyes' horizontal direction movements.

6. A driving support equipment for a vehicle, comprising:
an environs information detection unit for recognizing a solid object in an environs of the vehicle;
an eye motion detection unit for detecting an eye motion of a driver of the vehicle;
a dispersion value processing unit for processing a value showing a dispersion of the eye motions regarding said solid object based on the detected eye motion and detected information regarding said solid object; and
an attention state estimation unit for estimating an attention state of the driver regarding said solid object, using said value showing the dispersion of eye motions of the driver.

7. A driving support equipment of claim 6, wherein said attention state estimation unit estimates a steady gaze state, according to a ratio of a width of the solid object, with a value showing a dispersion of driver eye motions in a horizontal direction.

8. A driving state estimation equipment for a vehicle, comprising:
a solid object information detection unit for recognizing a solid object in an environs of the vehicle and detecting information regarding said solid object;
an eye motion detection unit for detecting an eye motion of a driver of the vehicle;
a determination area setting unit for setting a determination area based on the solid object information detected by said solid object information detection unit; and
a driving state determination unit for determining a driving state of the driver, based on a ratio of a stoppage period of a line of sight of the driver within said determination area to a standard stoppage period, said determination area being set by the determination area setting unit, and said standard stoppage period being a stoppage period of the line of sight of the driver within said determination area under circumstances set beforehand.

9. A driving state estimation equipment of claim 8, wherein
said driving state determination unit determines at least one of an overcautious state where a driving attention state regarding a preceding vehicle is greater, or an aimless state where a driving attention state regarding solid objects other than the preceding vehicle is greater.

10. A driving state estimation equipment for a vehicle, comprising:
a solid object information detection unit for recognizing a solid object in an environs of the vehicle and detecting information regarding said solid object;
an eye motion detection unit for detecting an eye motion of a driver of the vehicle;
a determination area setting unit for setting a determination area based on the solid object information detected by said solid object information detection unit; and
a driving state determination unit for determining a driving state of the driver, based on a ratio of a stoppage period of a line of sight of the driver within said determination area to a standard stoppage period, said determination area being set by the determination area setting unit, and said standard stoppage period being a stoppage period of the line of sight of the driver within said determination area under circumstances set beforehand.

11. A driving state estimation equipment of claim 10, wherein
said driving state determination unit determines at least one of an overcautious state where a driving attention state regarding a preceding vehicle is greater, or an aimless state where a driving attention state regarding solid objects other than the preceding vehicle is greater.

12. A driving state estimation equipment for a vehicle, comprising:
a solid object information detection unit for recognizing a solid object in an environs of the vehicle and detecting information regarding said solid object;
an eye motion detection unit for detecting an eye motion of a driver of the vehicle;
a determination area setting unit for setting a determination area based on the solid object information detected by said solid object information detection unit; and
a driving state determination unit for determining a driving state of the driver, based on said driver's eye angle and on a degree of concentration of a line of sight of the driver existing within said determination area set by the determination area setting unit.

13. A driving state estimation equipment of claim 12, wherein
said driving state determination unit determines at least one of an overcautious state where a driving attention state regarding a preceding vehicle is greater, or an aimless state where a driving attention state regarding solid objects other than the preceding vehicle is greater.

14. A driving state estimation equipment for a vehicle, comprising:
a solid object information detection unit for recognizing a solid object in an environs of the vehicle and detecting information regarding said solid object;
an eye motion detection unit for detecting an eye motion of a driver of the vehicle;
a determination area setting unit for setting a determination area based on information on a plurality of solid objects detected by said solid object information detection unit which does not include information on a preceding vehicle; and
a driving state determination unit for determining a driving state of the driver, based on a degree of concentration of a line of sight existing within said determination area set by the determination area setting unit.

15. A driving state estimation equipment of claim 14, wherein
said driving state determination unit determines at least one of an overcautious state where a driving attention state regarding a preceding vehicle is greater, or an aimless state where a driving attention state regarding solid objects other than the preceding vehicle is greater.

16. A driving support equipment of claim 15, further comprising:
an alarm control unit for varying an alarm of the vehicle according to said determined driving states of the driver, wherein if said driving state determination unit determines said overcautious state, said alarm control unit moderates in intensity at least an alarm focused on said preceding vehicle from an alarm performed in a usual state, and if said aimless state is determined, said alarm control unit moderates in intensity at least an alarm focused on frontward obstruction objects other than said preceding vehicle from an alarm performed in a usual state.

* * * * *